United States Patent [19]

Coutts et al.

[11] Patent Number: 5,389,773
[45] Date of Patent: Feb. 14, 1995

[54] SELF-SERVICE SYSTEM HAVING TRANSACTION PREDICTIVE CAPABILITY AND METHOD OF USING

[75] Inventors: Michael G. Coutts; Alan F. Newell; Ian W. Ricketts, all of Dundee, Scotland

[73] Assignee: NCR Corporation, Dayton, Ohio

[21] Appl. No.: 151,648

[22] Filed: Nov. 15, 1993

[30] Foreign Application Priority Data

Sep. 29, 1993 [GB] United Kingdom ............... 9320072

[51] Int. Cl.6 .............................................. G06F 15/30
[52] U.S. Cl. ..................................... 235/379; 235/380; 235/382; 235/382.5; 235/438; 902/3; 902/5; 902/10; 364/408; 340/825.34
[58] Field of Search ............ 235/379, 380, 382, 382.5, 235/438; 902/3, 5, 31, 32, 10; 364/408; 340/825.34

[56] References Cited

U.S. PATENT DOCUMENTS

| 4,025,905 | 5/1977 | Gorgens | 395/275 |
|---|---|---|---|
| 4,577,763 | 3/1986 | Placke et al. | 209/534 |
| 4,580,040 | 4/1986 | Granzow et al. | 235/379 |
| 4,617,457 | 10/1986 | Granzow et al. | 235/379 |
| 4,636,947 | 1/1987 | Ward | 235/379 |
| 4,788,418 | 11/1988 | Tsukui | 235/380 X |
| 4,792,018 | 12/1988 | Humble et al. | 235/383 |
| 4,912,308 | 3/1990 | Takahira | 235/379 |
| 5,010,238 | 4/1991 | Kadono et al. | 235/379 |
| 5,064,999 | 11/1991 | Okamoto et al. | 235/379 |
| 5,120,945 | 6/1992 | Nishibe et al. | 235/380 X |
| 5,148,365 | 9/1992 | Dembo | 364/408 X |
| 5,276,617 | 1/1994 | Hiroya et al. | 235/379 X |

FOREIGN PATENT DOCUMENTS 3168892  7/1991  Japan ................................ 235/379

Primary Examiner—Donald Hajec
Assistant Examiner—Esther H. Chin
Attorney, Agent, or Firm—Albert L. Sessler, Jr.

[57] ABSTRACT

A self-service system, such as an automated teller machine (ATM) system, uses predictive technology. When a user begins a transaction by inserting an identification card into a card reader of an ATM, the predictive technology predicts which service or services provided by the system the user is likely to request. This prediction is based upon a stored record in the system, representing previous transactions by that user. The prediction is made in advance of completion of an authorization process for the transaction, to increase the speed of operation of the ATM in carrying out the transaction. For example, to reduce overall transaction time, the ATM can count out a predicted amount of cash in advance of an anticipated withdrawal request. Also, the prediction is used to generate a special display for a particular user, the display being designed to simplify the decisions and selections required to be made by the user.

25 Claims, 4 Drawing Sheets

SELF-SERVICE SYSTEM HAVING TRANSACTION PREDICTIVE CAPABILITY AND METHOD OF USING

BACKGROUND OF THE INVENTION

The present invention relates to a self-service business system and more particularly relates to such a system having the capability of predicting the type of transaction which a particular customer is likely to initiate and of pre-conditioning the apparatus on the basis of such prediction to expedite its operation in carrying out the transaction.

As the complexity and range of services made available by self-service systems such as automated teller machines (ATMs) increase, there is a desirability that the means by which a user interacts with these systems should be improved. Where the services provided by a self-service device are both large in number and varied in nature, it has been necessary to break these up into functional groups. It is known to provide a series of menu interfaces which allow a user to navigate through these groups, allowing the user to access the actual service which the user requires. Generally, the user must evaluate each of the options presented on a menu and select one of them, either to proceed to a lower level menu or to request a required service. The number of decisions and selections that a user must make increases as the range of facilities provided increases. This increasing workload for the user is known as cognitive load, and is likely to have an increasing impact in the future as regards the willingness of a user to use the full range of facilities offered by a self-service system.

SUMMARY OF THE INVENTION

According to the invention there is provided a self-service system including a user interface unit and controller means for controlling the operation of said system, said user interface unit including user identification means and input means operable by a user for initiating a selected self-service transaction, characterized by storage means arranged to store data relating to previous transactions initiated by various users of said system, and prediction means coupled to said storage means, to said identification means and to said controller means and arranged to predict the type of transaction to be initiated by a given user, the mode of operation of said system when performing a transaction for a particular user being dependent on a prediction made by said prediction means following identification of that user.

Thus, the present invention employs a technique in which aspects of each user's previous behaviour and requirements in self-service transactions are recorded and are then used to predict what that user's probable requirements will be in future transactions. With this system, the interfaces and operation of the system can be modified to best address these needs. By constantly updating the system's knowledge of the user's behaviour, the prediction can adapt to the user's changing requirements and experience. For example, if each time the system is used the record of previous use is updated, it is possible for the prediction to adapt to changing patterns of use.

Within the self service environment there are a number of specific services that can be performed using any one terminal. For example, a standard ATM allows the withdrawal of a number of different cash amounts, the printing of mini-statements, the display or printing of a user's account balance, the requesting of a full statement to be sent to a user, and the making of a deposit. In any one transaction, a user may wish to select one or more of these services. For example, a user may wish to withdraw a specified amount of cash, such as $20, and obtain a mini-statement.

Each time that a user performs a transaction, the user behaviour and the final requirements can be recorded in some manner by the self-service system. This recorded information can then be used to construct a data base which characterizes that user's behaviour pattern with respect to the user's use of the terminals included in the system. This data base can be stored in the host computer of the system, in the user's card or in a combination thereof, as appropriate.

It is accordingly an object of the present invention to provide a self-service business system having the features of simplified mode of operation and reduced transaction time.

Another object is to provide a self-service business system having predictive capability with respect to future transactions of a given customer.

Another object is to provide a method for operating a self-service apparatus employing predictive technology.

Another object is to provide a self-service apparatus having predictive capability with respect to future transactions which can be modified in accordance with changing patterns of use.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
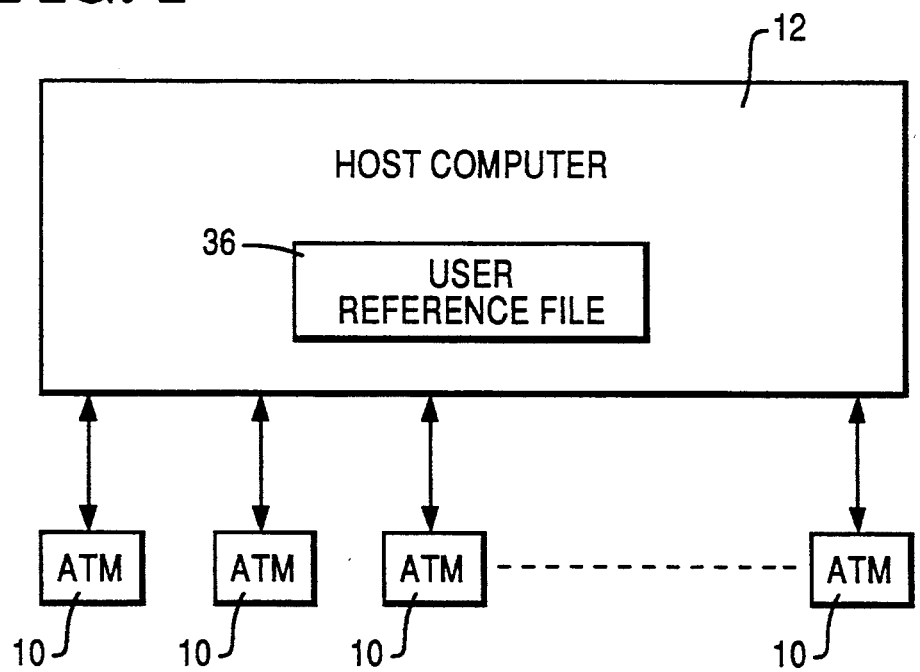
FIG. 1 is a block diagram of a self-service system in accordance with the invention incorporating a plurality of ATMs.
Figure 2:
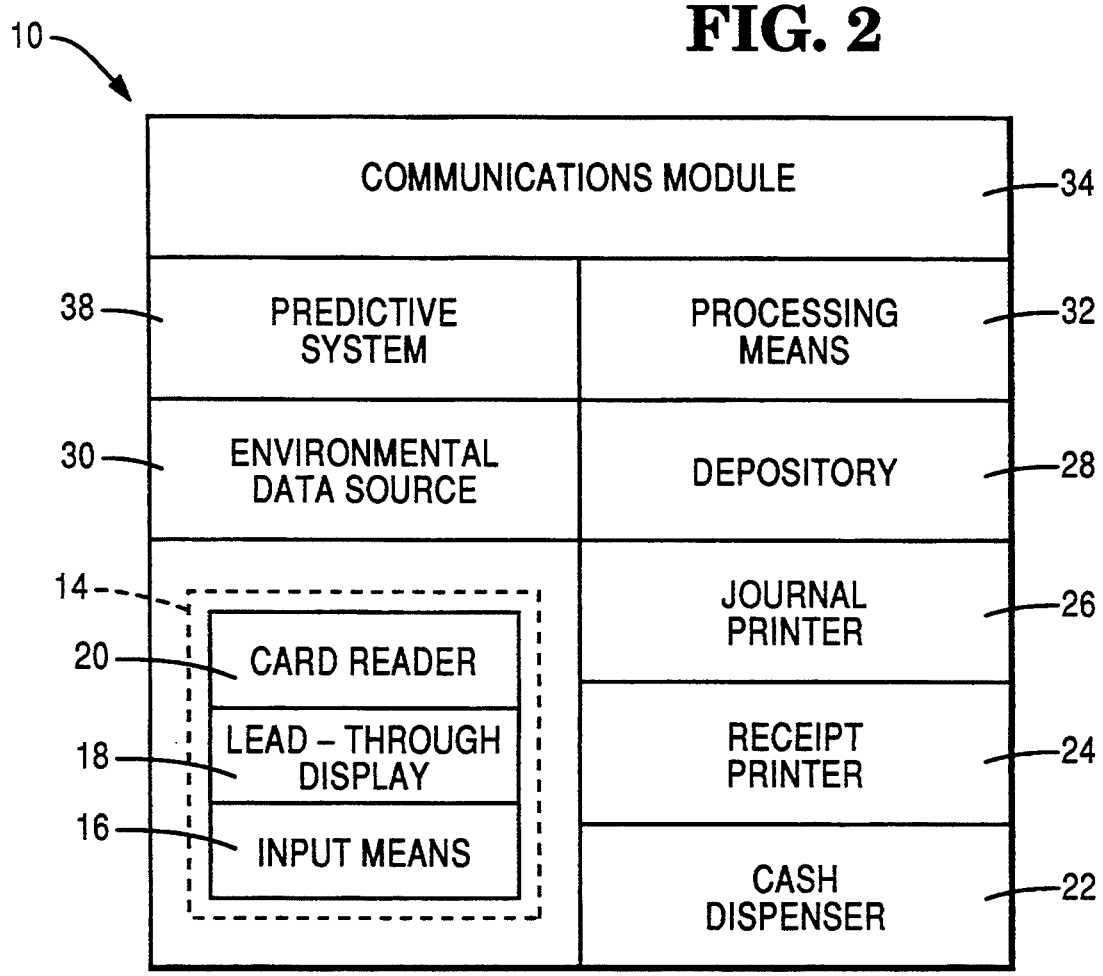
FIG. 2 is a schematic diagram of one of the ATMs of FIG. 1.

Referring to FIGS. 1 and 2, the self-service business system shown therein includes a plurality of ATMs 10 connected in conventional manner to a host computer 12. As shown in FIG. 2, each ATM 10 includes a conventional user interface unit on fascia 14 incorporating key operated input means 16 for enabling a user of the ATM 10 to enter a personal identification number (PIN) and to select desired services provided by the ATM 10, a lead-through display screen 18 for indicating to the user the options available to him in carrying out a transaction on the ATM 10 and for indicating the keys of the input means 16 which require to be operated in order to select a desired service or services, and a card reader 20 for reading account information contained on an identification card which the user inserts in operation into a slot (not shown) forming part of the card reader 20 whereby the user can be identified. Other conventional modules included in each ATM 10 include a cash dispenser 22 for counting and presenting currency notes to a user, a receipt printer 24 for printing receipts to be presented to a user when a deposit or cash withdrawal is made using the ATM 10 and for printing a mini-statement or balance of account statement when requested by a user, a journal printer 26 for printing a record of transactions carried out by the ATM 10, a depository 28 for receiving envelopes containing cash and/or checks deposited by a user, environmental data source means 30 for providing data as to the time and date of a transaction together with the location of the ATM 10, processing means 32 for controlling the operations of the various elements of the ATM 10, and a communications module 34 for coupling the ATM 10 to the host computer 12.

The host computer 12 includes a user reference file 36 which includes records of the types of transactions performed by users in previous uses of the system which includes the various ATMs 10, and also environmental data relating to these transactions. Also included in each ATM 10 is a predictive system 38 which is arranged to use the information contained in the user reference file 36 for a particular user to ascertain what service or services have been requested most frequently by that user at particular times, dates and locations in the past, and therefore what service or services are most likely to be requested by that user when he next initiates a transaction by inserting his identification card into the card reader 20 of one of the ATMs 10. The processing means 32 of each ATM 10 acts in dependence on the output of the predictive system 38 to cause the ATM 10 to perform certain operations at certain times and in certain sequences in order to cause the ATM 10 to complete a transaction with greater overall speed, and to simplify the decisions and selections which need to be made by the user, if the service or services actually requested is or are the same as the service, or at least some of the services, which have been predicted. Thus, the processing means 32 causes a particular menu to be displayed on the lead-through display screen 18 following initiation of a transaction by a user and following a prediction that particular services are likely to be requested by the user. For example, a simplified menu could be displayed consisting of only four questions, such as: "Do you require $20?", "Do you require $30?", "Do you require a mini-statement?", and "Do you require some other transaction?". Also, immediately following the initiation of a transaction, the ATM 10 could obtain system authorization for, and count out ready for presenting to the owner, a predicted amount of cash in advance of an anticipated withdrawal request. If, for example, a withdrawal request is predicted to be either $20 or $30, then $20 will be counted out since, if $30 is actually requested, a further $10 can readily be counted and added to the already counted amount.

Figure 3:
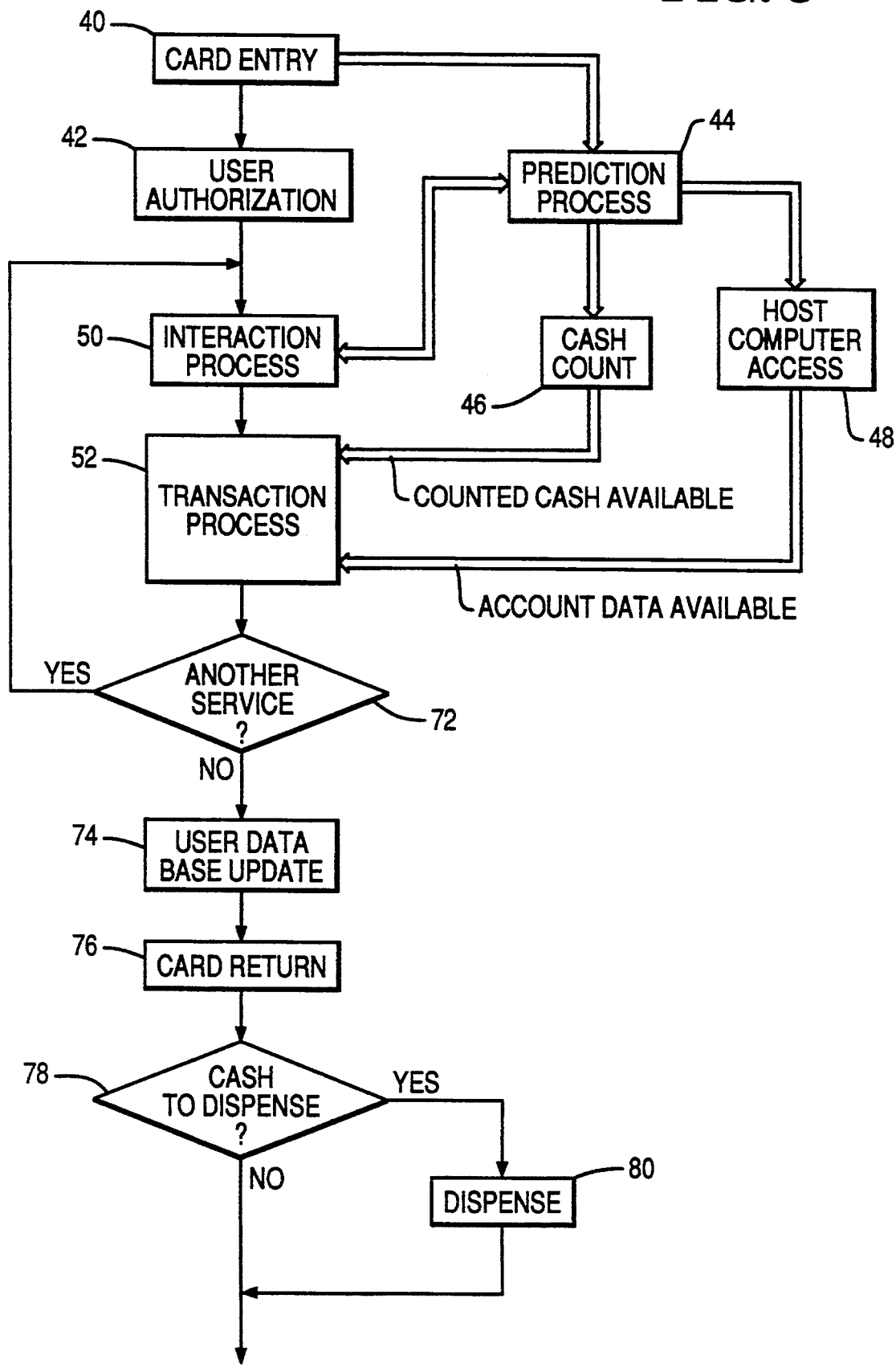
FIG. 3 is a flow diagram illustrating the operation of the self-service system.
Figure 4:
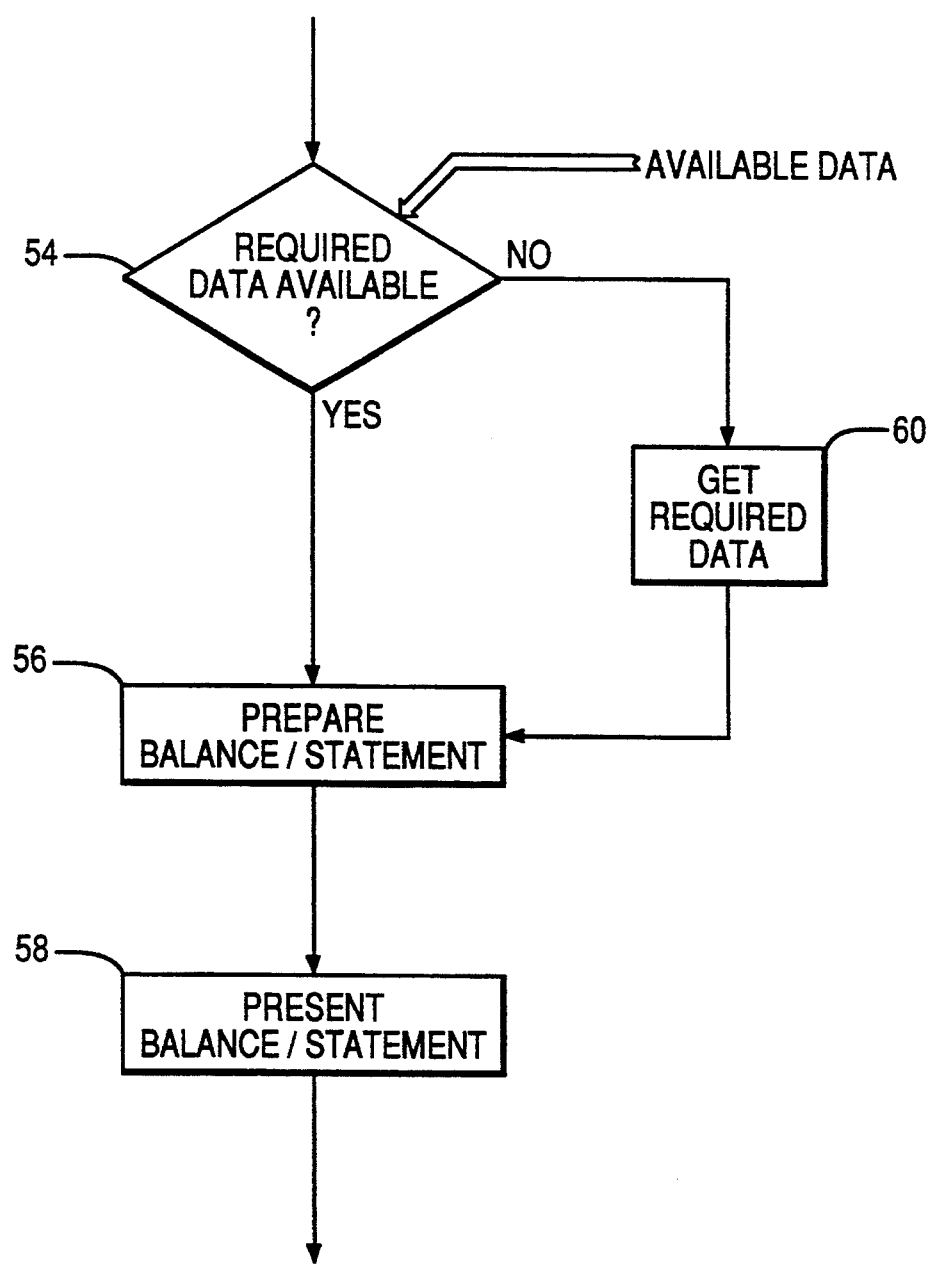
FIG. 4 is a flow diagram illustrating part of the transaction illustrated in FIG. 3.

The operation of the self-service system will now be described with reference to FIGS. 3 to 5. It should be noted that in FIG. 3 control flow is represented by a single line while data flow is represented by a double line. Referring particularly now to FIG. 3, a transaction is initiated by a user inserting his identification card (block 40) into the slot (not shown) forming part of the card reader 20 of the ATM 10 being used by the user. A user authorization process (block 42) is then initiated by virtue of the user entering his PIN in the interface unit 14 using the input means 16.

In parallel with the user authorization process 42, a prediction process (block 44) is performed by the predictive system 38 of the relevant ATM 10, the prediction process being initiated in response to user identification data derived from the identification card being applied to the predictive system 38. At the beginning of the prediction process 44, data concerning the user's previous behaviour pattern derived from the user reference file 36 and date and time data derived from the environmental data source 30 are loaded into the predictive system 38. On the basis of the loaded data, the predictive system 38 predicts what service or services the user is likely to wish to use, and provides an assessment of the probability that a particular service will be requested. Following such prediction and assessment, the predictive system 38 determines what is the most appropriate menu interface for the user and causes this menu to be displayed on the display screen 18. At the same time, the predictive system 38 predicts whether the user is likely to request a cash withdrawal, and also whether the user is likely to request a service (request for a mini-statement or balance of account) requiring access to the host computer 12 in the course of the transaction. If a cash withdrawal is predicted, the predictive system 38 also predicts, in order of probability, the most likely amounts expected to be requested; on the basis of such prediction, the processing means 32 of the relevant ATM 10 causes the cash dispenser 22 to count out and have ready for presentation to the user (block 46) a particular amount of cash in advance of any request for a cash withdrawal actually being made by the user. If a request for a mini-statement or balance of account is predicted, the processing means 32 obtains the relevant information from the host computer 12 (block 48) and holds this information ready for preparing and printing out or displaying to the user a mini-statement or balance of account, again in advance of such request actually being made. It should be understood that each of the processes represented by the blocks 46 and 48 commences prior to the completion of the authorization process 42, thereby frequently enabling a saving in overall transaction time to be achieved.

After the user authorization process 42 has been completed and the user's identity has been verified, an interaction process (block 50) takes place in which using the information and lead-through instructions displayed on the display screen 18 the user requests a particular service by means of the input means 16. If this particular service is already one of the options displayed on the screen 18 at the commencement of the interaction process 50, the user simply actuates one or more of the keys of the input means 16, as indicated on the screen 18. If the service desired by the user is not one of the displayed options, then one or more alternative menus are displayed on the screen 18, in response to instructions entered by the user by means of the input means 16, until the desired service is one of the options displayed. It should be understood that in the course of an interaction process 50 in which one or more alternative menus are displayed there is an interchange of data between the interface unit 14 and the predictive system 38 whereby, if appropriate, the or each alternative menu is at least partly determined by predictions made by the predictive system 38. However, in some circumstances, particularly if the user desires a service inconsistent with his previous behaviour pattern, then a standard menu not based on any predictions may be displayed.

Transaction processing takes place (block 52) in response to a request for a particular service. Referring now additionally to FIG. 4, if the service request is a request for a mini-statement or balance of account then a check is initially made (block 54) as to whether the required data has already been made available (block 48) as a result of the prediction process 44. If the required data is already available, then the requested statement or balance information is immediately prepared (block 56) and presented to the user (block 58) by Way of a printed record prepared by the printer 24 or by way of a visual display on the screen 18. If the required data is not already available, then in conventional manner it is necessary to obtain the required data from the host computer 12 (block 60) before proceeding to the preparation and presentation of the statement or balance information (blocks 56 and 58).

Figure 5:
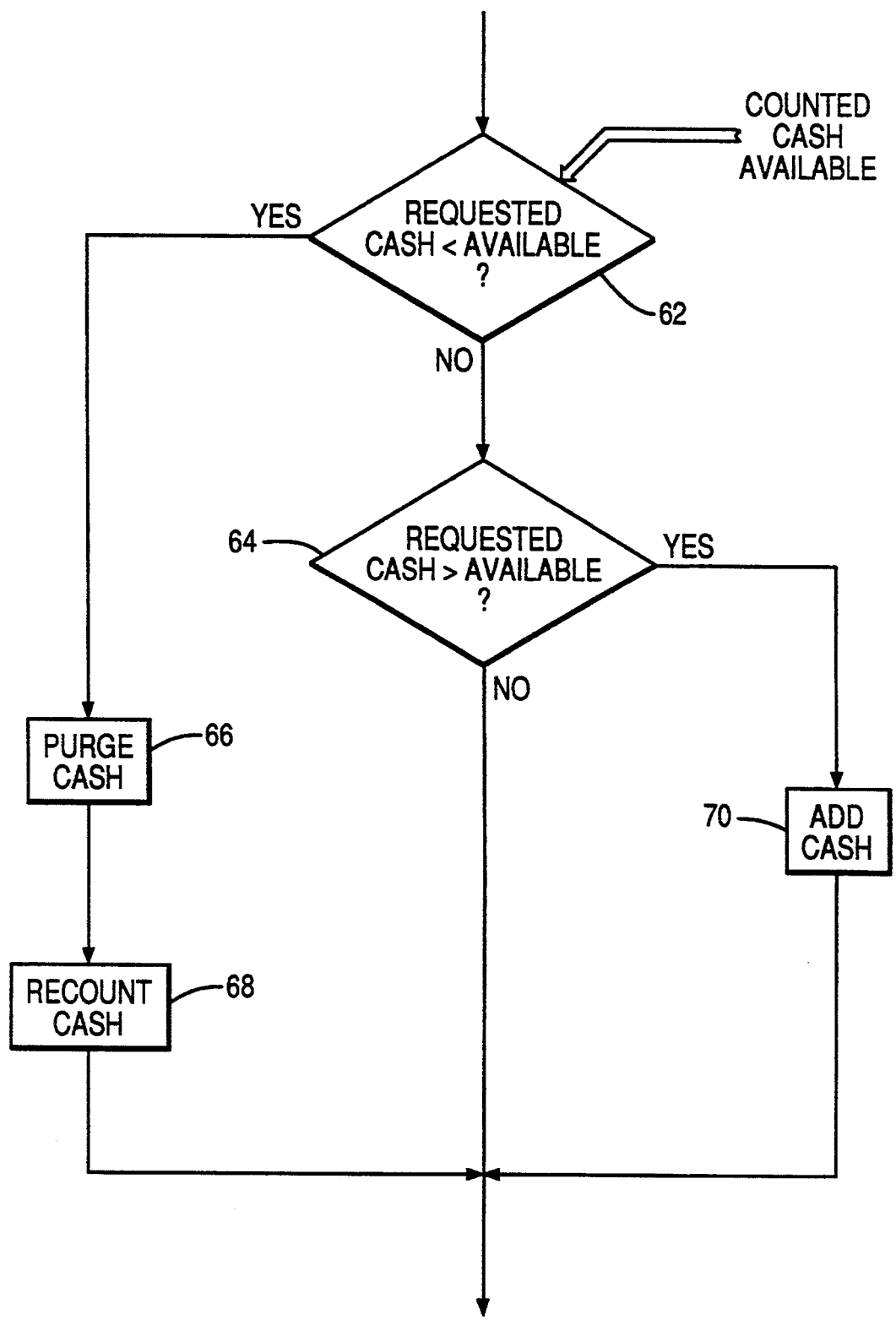
FIG. 5 is a flow diagram illustrating another part of the transaction illustrated in FIG. 3.

Referring now additionally to FIG. 5, if the service request is a request for a cash withdrawal, then a check is initially made (block 62) as to whether the amount of cash actually requested is less than the amount of cash already counted out and held available for presentation (block 46) as a result of the prediction process 44. If the requested amount is not less than the already available amount, then a check is made (block 64) as to whether the requested amount is greater than the available amount. If it is not greater, this means that the requested amount is the same as the available amount and so the transaction process can immediately proceed to the next stage. If, as a result of the check made in block 62, it is found that the requested amount of cash is less than the available amount then it is necessary to dispose of the already counted cash (block 66) by transporting this cash to a purge bin (not shown) in the ATM 10 and to initiate another cash counting process (block 68) in which the correct amount of cash is counted out before proceeding to the next stage of the transaction process. If, as a result of the check made in block 64, it is found that the requested amount of cash is greater than the available amount then it is necessary to add the appropriate additional amount of cash to the already counted amount (block 70) before proceeding to the next stage. It should be understood that since it is undesirable to have to purge cash on a frequent basis, then if the predictive system 38 predicts a cash withdrawal of two or more possible amounts with reasonably equal probabilities then in block 46 the lowest one of the possible amounts of cash will be counted out.

Referring again particularly to FIG. 3, after a transaction process 52 has been completed, a check is made (block 72) as to whether another service is required by the user. If another service is required, then the transaction process returns to block 50 for the appropriate further interaction process and transaction process to be carried out. If another service is not required, then the user reference file 36 is updated (block 74) so as to take account of the requested service or services and the environmental data relating to the present transaction, after which the user's identification card is returned to him (block 76). Finally, a check is made (block 78) as to whether cash is to be dispensed to the user. If no cash is to be dispensed, then the transaction process is terminated and the ATM reaadies itself for the next user transaction. If cash is to be dispensed, then the, already counted amount of cash is presented to the user (block 80) as the final stage in the transaction process.

In an alternative embodiment of a self service system in accordance with the invention, instead of storing a user reference file in the host computer 12, a data base containing a record of a user's previous transactions could be stored in the identification card for that user, this data being read out at the same time as the identification data for the user. In a further alternative embodiment, an audio user instruction module could be used instead of or in addition to the lead-through display screen 18.

It will be appreciated that since the prediction process and associated cash counting and computer accessing processes (blocks 46 and 48 of FIG. 3) of a system in accordance with the invention operate in parallel with the user authorization process (block 42), a significant saving in transaction time is achieved for .many of the transactions performed by the system. Moreover, since the menu interface is specifically designed for a particular user based on his previous behaviour pattern, the interaction process (block 50 of FIG. 3) can be significantly simplified for many user transactions thereby reducing the cognitive load.

Although the invention has been described with particular reference to a preferred embodiment thereof, variations and modifications of the present invention can be effected within the spirit and scope of the following claims.

What is claimed is:

1. A self-service system having the capability of predicting a type of transaction to be initiated by a customer, comprising:
a customer interface unit for initiating a selected type of self-service transaction;
controller means for controlling the operation of said system in response to the type of transaction initiated by said customer;
storage means for storing data relating to previous transactions of the system initiated by various customers;
input means for inputting transaction type data into said storage means;
prediction means coupled to said storage means for predicting the type of transaction to be initiated by a given customer; and
conditioning means controlled by said prediction means for conditioning said controller means to prepare said system for performing a certain type of transaction.

2. The self-service system of claim 1, also including currency dispensing means for dispensing currency as part of one type of transaction which can be initiated by a customer.

3. The self-service system of claim 2, in which said currency dispensing means can be pre-conditioned under control of the conditioning means for the dispensing of currency in accordance with a predicted type of transaction.

4. The self-service system of claim 1, also including deposit receiving means for receiving currency deposits as part of one type of transaction which can be initiated by a customer.

5. The self-service system of claim 1, also including statement issuing means for issuing a statement which is descriptive of a transaction which is initiated by a customer.

6. The self-service system of claim 5, in which said statement issuing means can be pre-conditioned under control of the conditioning means to issue a statement in accordance with a predicted type of transaction.

7. The self-service system of claim 1, in which the customer interface unit includes a menu display for leading a customer through various stages of a transaction, and in which said controller means can cause certain data to appear on said display in response to conditioning of said controller means by said conditioning means.

8. The self-service system of claim 7, in which the customer interface unit can be pre-conditioned under control of the conditioning means to provide a predetermined menu display in accordance with a predicted type of transaction.

9. The self-service system of claim 1, also including a card-reading means for reading a customer account card to ascertain the identity of a customer initiating a transaction of the system.

10. The self-service system of claim 9, in which the customer identity ascertained from reading the customer account card is used to access the storage means to obtain data relating to previous transactions initiated by the customer whose card is read.

11. A self-service system, comprising:
  a user interface unit including user identification means for identifying users and input means for initiating a selected self-service transaction by a user;
  controller means for controlling operation of said system;
  storage means for storing data relating to previous transactions initiated by various users of said system;
  prediction means coupled to said storage means, to said identification means, and to said controller means for predicting the type of transaction to be initiated by a given user, the mode of operation of said system when performing a transaction for a particular user being dependent upon a prediction made by said prediction means following identification of said user; and
  authorization means for authorizing a transaction in respect to the entry by a user of a personal identification number on said input means, said prediction means being arranged to commence the process for making said prediction prior to the completion of an authorization process for authorizing said transaction.

12. The self-service system of claim 11, in which said user interface unit is included in an automated teller machine.

13. The self-service system of claim 12, in which said automated teller machine includes cash dispensing means for dispensing cash, said cash dispensing means being arranged to commence counting a predetermined amount of cash determined by said prediction means prior to the completion of said authorization process.

14. The self-service system of claim 12, also including host computer means coupled to said prediction means and arranged to hold account information relating to said various users, a process for accessing and transmitting account information concerning a particular user to said automated teller machine being arranged to be commenced prior to the completion of said authorization process.

15. The self-service system of claim 12, which includes a plurality of automated teller machines each including a user interface unit and prediction means, said storage means being located separate from said automated teller machines and being arranged to store data relating to previous transactions carried out by any of said automated teller machines.

16. The self-service system of claim 11, in which said user identification means comprises a card reader for reading from a card information relating to a user.

17. The self-service system of claim 11, also including user instruction means associated with said input means for providing to a user information concerning the action to be taken by the user to cause a desired transaction to be carried out by said system, the information provided by said instruction means being dependent upon the prediction made by said prediction means.

18. The self-service system of claim 11, in which the information contained in said storage means is arranged to be updated each time a transaction is initiated by one of the various users of said system.

19. The self-service system of claim 11, also including environmental data source means coupled to said prediction means for providing environmental data relating to a particular transaction, the prediction made by said prediction means being dependent upon said environmental data.

20. A method for operating a self-service system employing predictive technology, comprising the following steps:
  (a) ascertaining the identity of a customer who is using the self-service system;
  (b) accessing a file containing records of previous transactions of that customer;
  (c) using the records of said file to generate a prediction as to at least one type of transaction which said customer is likely to initiate;
  (d) conditioning the system to be ready to perform a predicted type of transaction;
  (e) initiating a transaction by the customer;
  (f) comparing the type of transaction initiated by the customer with the type of transaction predicted;
  (g) utilizing the conditioned state of the system if the predicted and actual types of transaction are the same;
  (h) changing the state of the system to reflect the type of transaction selected by the customer if the types of transaction are not the same; and
  (i) adding information concerning the most recent transaction to said file to update said file.

21. The method of claim 20, in which the conditioning step (d) includes counting out a predicted amount of currency in advance if the predicted type of transaction is a withdrawal request.

22. The method of claim 20, in which the generation of a prediction in step (c) includes generating a prioritized list of predicted types of transactions.

23. The method of claim 20, in which the ascertaining of identity of step (a) comprises sensing of a customer identification card.

24. The method of claim 20, in which the conditioning step (d) includes causing certain data to appear on a customer lead-through display of the self-service system.

25. The method of claim 20, in which the conditioning step (d) includes printing a statement describing the transaction.

* * * * *